US012754306B2

(12) United States Patent
Chen

(10) Patent No.: US 12,754,306 B2
(45) Date of Patent: Oct. 6, 2026

(54) MOTION DETECTING METHOD AND RELATED MOTION DETECTING SYSTEM

(71) Applicant: RichWave Technology Corp., Taipei City (TW)

(72) Inventor: Tse-Peng Chen, Taipei City (TW)

(73) Assignee: RichWave Technology Corp., Taipei City (TW)

( * ) Notice: Subject to any disclaimer, the term of this patent is extended or adjusted under 35 U.S.C. 154(b) by 332 days.

(21) Appl. No.: 18/080,742

(22) Filed: Dec. 14, 2022

(65) Prior Publication Data

US 2023/0367001 A1 Nov. 16, 2023

Related U.S. Application Data

(60) Provisional application No. 63/340,474, filed on May 11, 2022.

(30) Foreign Application Priority Data

Sep. 8, 2022 (TW) .................................. 111134040

(51) Int. Cl.
*G01S 13/56* (2006.01)

(52) U.S. Cl.
CPC .................................... *G01S 13/56* (2013.01)

(58) Field of Classification Search
CPC ....................................................... G01S 13/56
See application file for complete search history.

(56) References Cited

U.S. PATENT DOCUMENTS 4,740,045 A * 4/1988 Goodson ................. G01S 7/023 342/115
10,009,987 B2 * 6/2018 Recker ................... H05B 47/16
2007/0176737 A1 8/2007 Friese
2023/0393245 A1 * 12/2023 Finkelstein ........... G01S 7/4816

FOREIGN PATENT DOCUMENTS

CN 101900835 A 12/2010
CN 101782648 B 3/2013
CN 103049955 A 4/2013
CN 109763738 A 5/2019
(Continued)

OTHER PUBLICATIONS

Office action mailed on Apr. 7, 2023 for the Taiwan application No. 111134040, filing date Sep. 8, 2022, pp. 1-8., Apr. 7, 2023.
(Continued)

*Primary Examiner* — Resha Desai
*Assistant Examiner* — Helena H Seraydaryan
(74) *Attorney, Agent, or Firm* — Winston Hsu

(57) ABSTRACT

A motion detecting system includes a microwave motion sensor and an MCU. After detecting a motion with a first configuration, the microwave motion sensor is configured to operate with a second configuration for detecting another motion. The MCU is configured to operate in different modes for performing corresponding actions based on whether the microwave motion sensor can detect motions with different configurations, thereby reducing power consumption. The present motion detecting system can determine the type of motions detected by the microwave motion sensor, thereby reducing the false alarm rate.

18 Claims, 5 Drawing Sheets

(56) References Cited

FOREIGN PATENT DOCUMENTS

| | | | |
|---|---|---|---|
| CN | 113888784 | A | 1/2022 |
| EP | 2 045 621 | A1 | 4/2009 |
| TW | 202141346 | A | 11/2021 |
| TW | I756958 | B | 3/2022 |
| TW | 202223343 | A | 6/2022 |

OTHER PUBLICATIONS

Office action mailed/issued on Sep. 25, 2025 for CN application No. 202211357406.6, pp. 1-4, Sep. 25, 2025.

Office action mailed/issued on Jun. 29, 2026 for CN application No. 202211357406.6, filing date: Nov. 1, 2022, pp. 1-3., Jun. 29, 2026.

* cited by examiner

MOTION DETECTING METHOD AND RELATED MOTION DETECTING SYSTEM

CROSS REFERENCE TO RELATED APPLICATION

This application claims the benefit of U.S. Provisional Application No. 63/340,474, filed on May 11, 2022. The content of the application is incorporated herein by reference.

TECHNICAL FIELD

The present invention is related to a motion detecting method and a motion detecting system, and more particularly, to a motion detecting method and a motion detecting system capable of reducing false alarm rate and power consumption.

BACKGROUND

Motion detecting technology has been widely used in security surveillance business. For example, a motion detector may be installed in the house entryway for alerting a user of motion in the area. Existing motion detectors normally adopt infrared (IR) sensors or microwave sensors. Since an IR sensor detects an object by picking up its infrared radiation (thermal energy), its accuracy is sensitive to environmental temperature and brightness. A microwave sensor can emit microwave radiation, and phase shifts in the reflected microwaves due to motion of an object toward (or away from) the receiver may be used to identify different motions.

Although the accuracy of microwave sensors is relatively insensitive to environmental temperature and brightness, false alarms can easily be triggered by the occurrence of a swinging tree, a small insect or a passer-by. Therefore, there is a need for a motion detecting system with low false alarm rate for security surveillance purpose.

SUMMARY

The present invention provides a motion detecting method. The method includes an MCU operating in a first mode in response to a microwave motion sensor operating with a first configuration does not detect a first motion; the microwave motion sensor sending a first notice signal to the MCU in response to detecting the first motion with the first configuration; after receiving the first notice signal, the MCU operating in a second mode for performing a first action and sending a first configuration signal to the microwave motion sensor for instructing the microwave motion sensor to operate with a second configuration; in response to detecting a second motion within a first predetermined period after switching to operate with the second configuration, the microwave motion sensor continuing to operate with the second configuration and sending a second notice signal to the MCU for instructing the MCU to perform a second action; and in response to unable to receive the second notice signal within the first predetermined period, the MCU sending a second configuration signal to the microwave motion sensor for instructing the microwave motion sensor to operate with the first configuration and the MCU switching to operate in the first mode.

The present invention also provides a motion detecting system which includes a microwave motion sensor and an MCU. The microwave motion sensor is configured to operate with a first configuration when unable to receive a first configuration signal or when receiving a second configuration signal; operate with a second configuration when receiving the first configuration signal; send a first notice signal when detecting a first motion with the first configuration; and send a second notice signal when detecting a second motion within a first predetermined period after switching to operate with the second configuration. The MCU is configured to operate in a first mode when the microwave motion sensor operating with the first configuration does not detect the first motion; after receiving the first notice signal, switch from the first mode to a second mode for performing a first action and send the first configuration signal to the microwave motion sensor for instructing the microwave motion sensor to operate with a second configuration; after receiving a second notice signal, perform a second action and send the first configuration signal for instructing the microwave motion sensor to operate with the second configuration; and when unable to receive the second notice signal within the first predetermined period, send the second configuration signal to the microwave motion sensor for instructing the microwave motion sensor to operate with the first configuration and switch to operate in the first mode.

DETAILED DESCRIPTION

Figure 1:
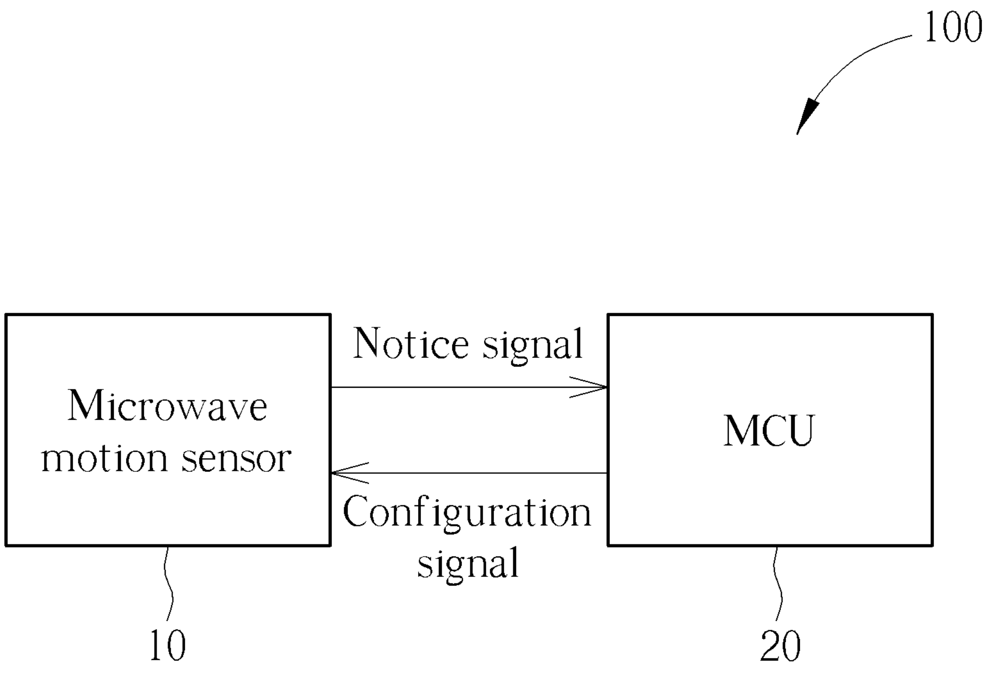
FIG. 1 is a function diagram illustrating a motion detection system according to an embodiment of the present invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a function diagram illustrating a motion detection system 100 according to an embodiment of the present invention. The motion detection system 100 includes a microwave motion sensor 10 and a micro control unit (MCU) 20. The microwave motion sensor 10 is configured to selectively operate with a first configuration or a second configuration according to a configuration signal provided by the MCU 20, and to send a notice signal to the MCU 20 when detecting a motion. The MCU 20 is configured to perform various actions according to the notice signal received from the microwave motion sensor 10 and generate the configuration signal accordingly. The detailed operations of the microwave motion sensor 10 and the MCU 20 will be described in subsequent paragraphs.

In an embodiment of the present invention, the MCU 20 may operate in a first mode or in a second mode, wherein the MCU 20 consumes less power when operating in the first mode than when operating in the second mode. For example, the first mode may be a low-power mode (such as hibernate mode or standby mode), and the second mode may be a normal mode.

Figure 2A:
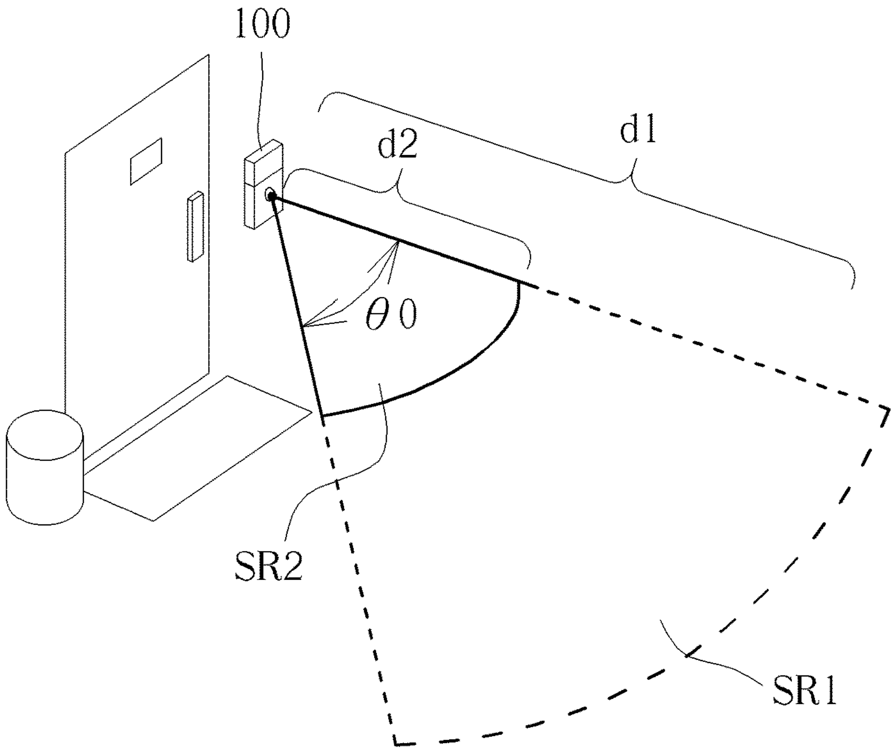
FIG. 2A is a diagram illustrating the implementation and the operation of a motion detecting system according to an embodiment of the present invention.
Figure 2B:
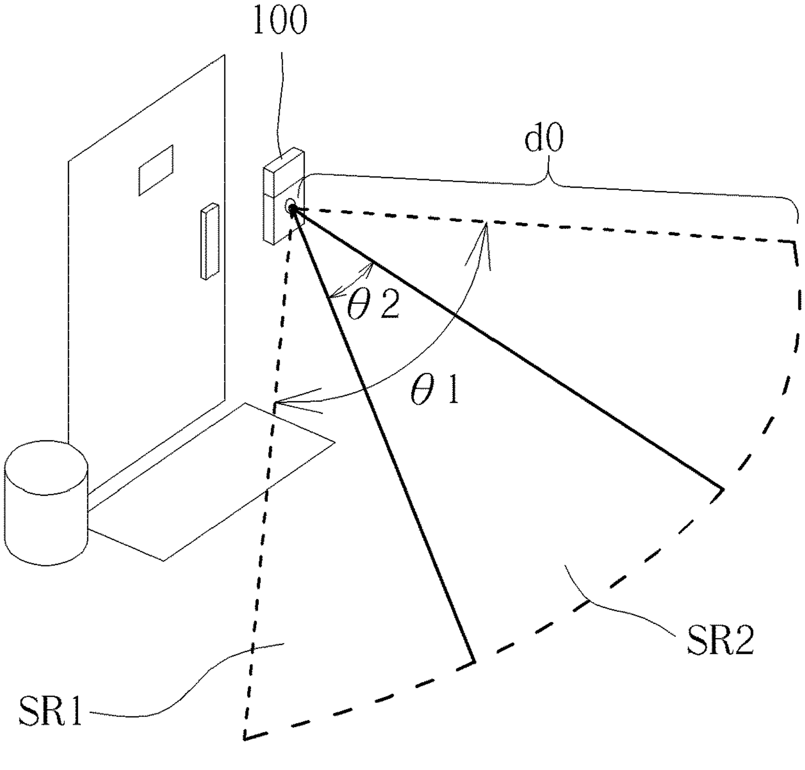
FIG. 2B is a diagram illustrating the implementation and the operation of a motion detecting system according to another embodiment of the present invention.
Figure 2C:
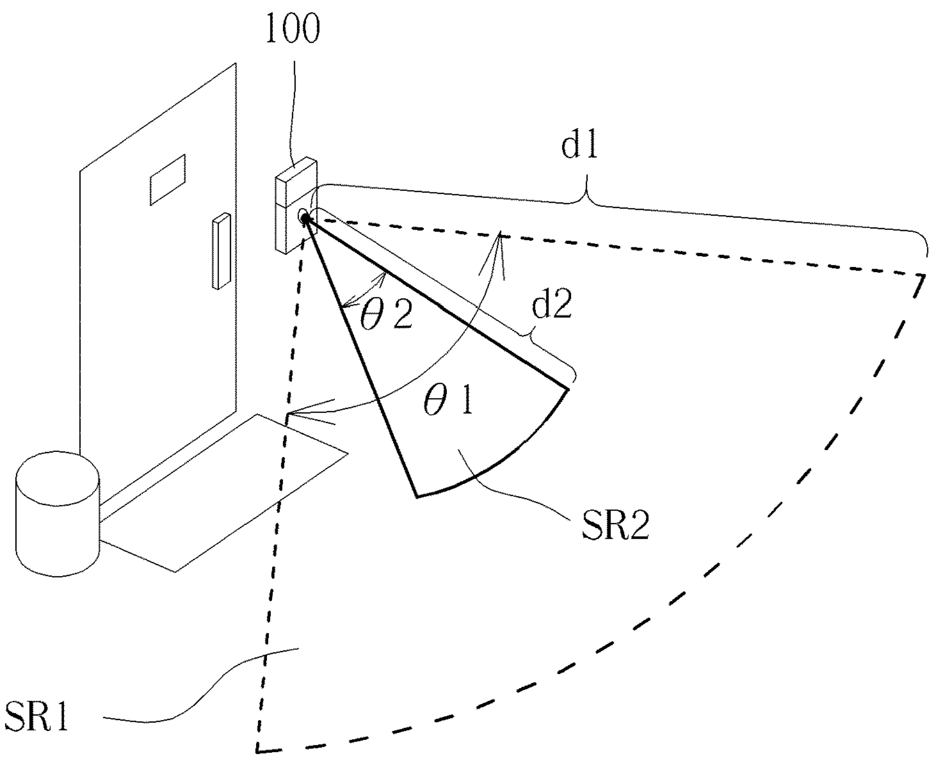
FIG. 2C is a diagram illustrating the implementation and the operation of a motion detecting system according to another embodiment of the present invention.

FIGS. 2A-2D are diagrams illustrating the implementation and the operation of the motion detecting system 100 according to embodiments of the present invention. In the present invention, the motion detection system 100 may be implemented as a smart doorbell or a smart door lock disposed at a surveillance location, such as, but not limited to, at the door of a user's house, working place or rented accommodation. In FIGS. 2A-2C, SR1 represents the sensing range of the microwave motion sensor 10 when operating with the first configuration (designated by the regions within the solid lines and the dotted lines), and SR2 represents the sensing range of the microwave motion sensor 10 when operating with the second configuration (designated by the region within the solid lines).

In the embodiment depicted in FIG. 2A, the microwave motion sensor 10 performs long-distance motion detection when operating with the first configuration and performs short-distance motion detection when operating with the second configuration. For example, the sensing ranges SR1 and SR2 may be fan-shaped regions each extending from the center of the microwave motion sensor 10 in the motion detecting system 100, wherein the central angles of the sensing ranges SR1 and SR2 are both θ0, the radius of the sensing region SR1 is d1, the radius of the sensing region SR2 is d2, and d1 is greater than d2. In an embodiment, d1 may be equal to 3 meters and d2 may be equal to 10 centimeters, but not limited thereto.

In the embodiment depicted in FIG. 2B, the microwave motion sensor 10 performs wide-range motion detection when operating with the first configuration and performs narrow-range motion detection when operating with the second configuration. For example, the sensing ranges SR1 and SR2 may be fan-shaped regions each extending from the center of the microwave motion sensor 10 in the motion detecting system 100, wherein the radii of the sensing regions SR1 and SR2 are both d0, the central angle of the sensing range SR1 is θ1, the central angle of the sensing range SR2 is θ2, and θ1 is greater than θ2. In an embodiment, θ1 may be equal to 90 degrees and θ2 may be equal to 30 degrees, but not limited thereto.

In the embodiment depicted in FIG. 2C, the microwave motion sensor 10 performs long-distance and wide-range motion detection when operating with the first configuration and performs short-distance and narrow-range motion detection when operating with the second configuration. For example, the sensing ranges SR1 and SR2 may be fan-shaped regions each extending from the center of the microwave motion sensor 10 in the motion detecting system 100, wherein the radius of the sensing region SR1 is d1, the radius of the sensing region SR2 is d1, the central angle of the sensing range SR1 is θ1, the central angle of the sensing range SR2 is θ2, d1 is greater than d2, and θ1 is greater than θ2. In an embodiment, d1 may be equal to 3 meters, d2 may be equal to 10 centimeters, θ1 may be equal to 90 degrees and θ2 may be equal to 30 degrees, but not limited thereto.

Figure 2D:
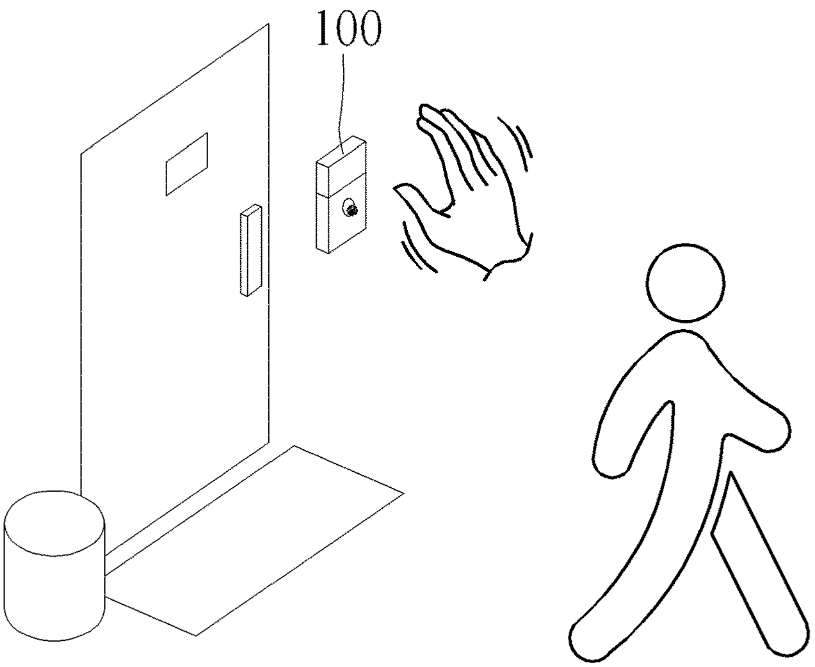
FIG. 2D is a diagram illustrating the implementation and the operation of a motion detecting system according to another embodiment of the present invention.

In the embodiment depicted in FIG. 2D, the microwave motion sensor 10 performs slow-speed motion detection or low-frequency motion detection when operating with the first configuration, such as detecting the motion of a walking pedestrian; the microwave motion sensor performs fast-speed motion detection or high-frequency motion detection when operating with the second configuration, such as detecting the motion of a hand wave or a finger inputting passwords.

Figure 3:
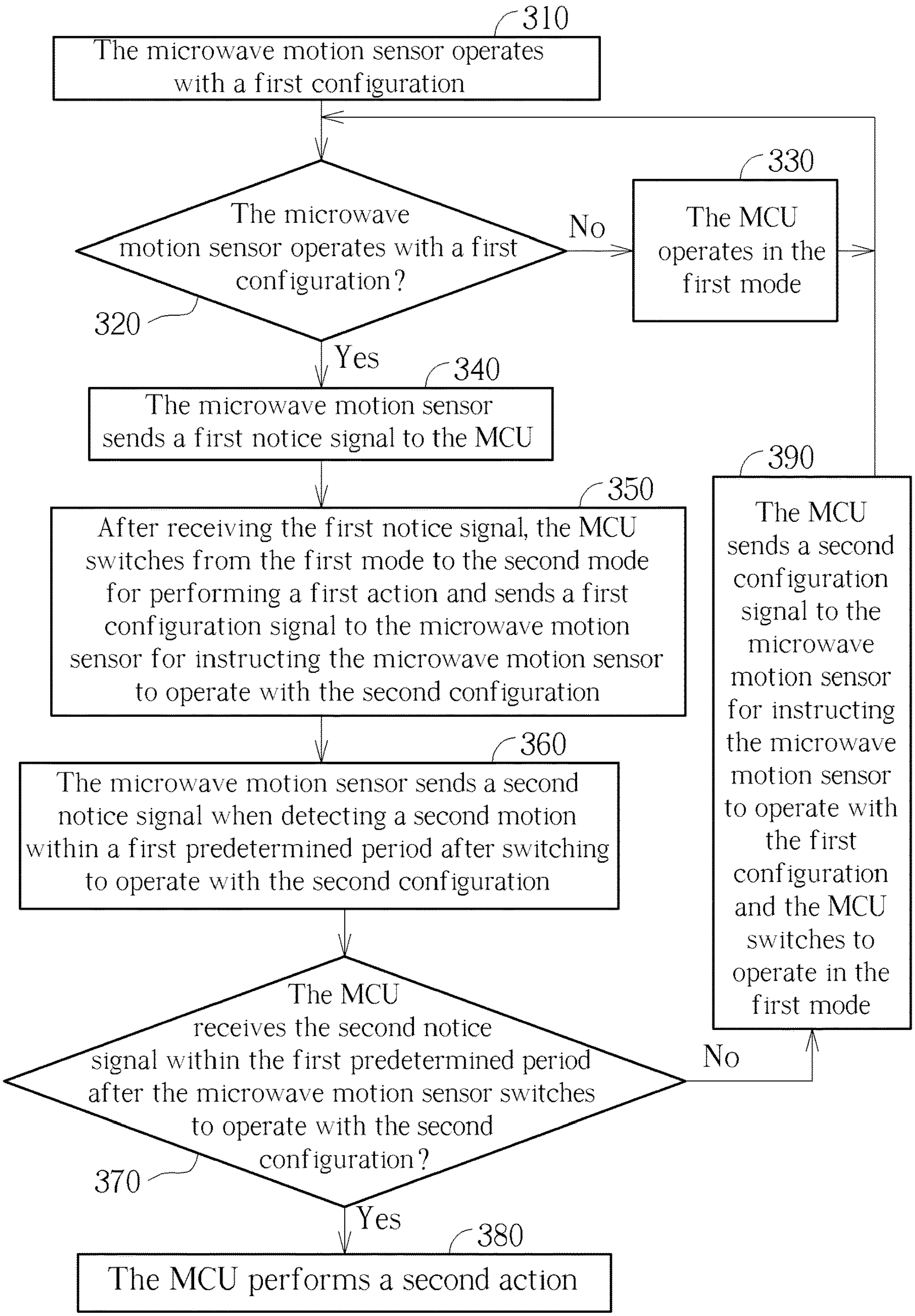
FIG. 3 is a flowchart illustrating the operation of a motion detection system when implemented as a smart doorbell according to an embodiment of the present invention.

FIG. 3 is a flowchart illustrating the operation of the motion detection system 100 when implemented as a smart doorbell. The flowchart in FIG. 3 includes the following steps:

Step 310: the microwave motion sensor 10 operates with a first configuration.

Step 320: determine whether the microwave motion sensor 10 detects a first motion when operating with the first configuration; if yes, execute step 340; if no, execute step 330.

Step 330: the MCU 20 operates in the first mode; execute step 320.

Step 340: the microwave motion sensor 10 sends a first notice signal to the MCU 20.

Step 350: after receiving the first notice signal, the MCU 20 switches from the first mode to the second mode for performing a first action and sends a first configuration signal to the microwave motion sensor 10 for instructing the microwave motion sensor 10 to operate with the second configuration.

Step 360: the microwave motion sensor 10 sends a second notice signal when detecting a second motion within a first predetermined period after switching to operate with the second configuration.

Step 370: determine whether the MCU 20 receives the second notice signal within the first predetermined period after the microwave motion sensor 10 switches to operate with the second configuration; if yes, execute step 380; if no, execute step 390.

Step 380: the MCU 20 performs a second action.

Step 390: the MCU 20 sends a second configuration signal to the microwave motion sensor 10 for instructing the microwave motion sensor 10 to operate with the first configuration and the MCU 20 switches to operate in the first mode; execute step 320.

In the embodiment depicted in FIG. 3, the microwave motion sensor 10 may perform long-distance motion detection (as depicted by the sensing range SR1 in FIG. 2A), wide-range motion detection (as depicted by the sensing range SR1 in FIG. 2B), long-distance and wide-range motion detection (as depicted by the sensing range SR1 in FIG. 2C), or slow-speed/low-frequency motion detection (as depicted by the sensing range SR1 in FIG. 2D) when operating with the first configuration; the microwave motion sensor may perform short-distance motion detection (as depicted by the sensing range SR2 in FIG. 2A), narrow-range motion detection (as depicted by the sensing range SR2 in FIG. 2B), short-distance and narrow-range motion detection (as depicted by the sensing range SR2 in FIG. 2C), or fast-speed/high-frequency motion detection (as depicted by the sensing range SR2 in FIG. 2D) when operating with the second configuration. The MCU 20 may perform the first action in the first mode by notifying a receiving terminal that an object is approaching the location of the motion detecting system 100. The MCU 20 may perform the second action in the second mode by notifying the receiving terminal that a short-distance movement event caused by the object has occurred at the location of the motion detecting system 100.

In step 310, the microwave motion sensor 10 of the motion detecting system 100 (implemented as a smart doorbell) initially operates with the first configuration. In step 320, it is determined whether the microwave motion sensor 10 can detect the first motion when operating with the first configuration. The first motion may be an object entering the long-distance detecting range, an object entering the wide-range detecting range, an object entering the long-distance and wide-range detecting range, or a slow-speed/low frequency motion.

When the microwave motion sensor 10 does not detect the first motion when operating with the first configuration, the MCU 20 is configured to operate in the first mode in step 330, thereby reducing the power consumption of the motion detecting system 100.

When the microwave motion sensor 10 detects the first motion when operating with the first configuration, it indicates that an object has entered the long-distance detecting range or the wide-range detecting range, or that the object exhibits slow-speed/low frequency movement. The above-mentioned object may be a co-living relative or friend, a visitor or and a passer-by. The above-mentioned slow-speed/low frequency movement may be the walking of a passer-by. The detection of the first motion indicates an object is approaching the location of the motion detecting system 100. Under such circumstance, the microwave motion sensor 10 is configured to send the first notice signal (such as a wake-up signal) to the MCU 20 in step 340.

In step 350, after receiving the first notice signal, the MCU 20 is configured to switch from the first mode to the second mode for performing the first action, such as notifying the receiving terminal that an object is approaching the location of the motion detecting system 100, or that a slow-speed motion or a low-frequency motion has been detected at the location of the motion detecting system 100. For example, the MCU 20 may send a notification message to any pre-linked user device, such as a cell phone, a tablet computer or a personal computer, but not limited thereto. Also, the MCU 20 is configured to send the first configuration signal to the microwave motion sensor 10 for instructing the microwave motion sensor 10 to operate with the second configuration, thereby determining the identity and intention of the approaching object.

When the microwave motion sensor 10 detects the second motion when operating with the second configuration, it indicates that the above-mentioned object has entered the short-distance detecting range or the narrow-range detecting range, or that the object exhibits fast-speed/high frequency movement. For example, the detected second motion may be the hand wave of a visitor or a bell-ringing hand gesture, but not limited thereto. When the microwave motion sensor 10 does not detect the second motion within the first predetermined period after switching to operate with the second configuration, it indicates that the first motion detected with the first configuration may be caused by a passer-by and does not require attention. Therefore, the microwave motion sensor 10 is configured to send the second notice signal (such as a wake-up signal) only when detecting the second motion within the first predetermined period after switching to operate with the second configuration in step 360.

In step 370, when the MCU 20 receives the second notice signal within the first predetermined period after the microwave motion sensor 10 switches to operate with the second configuration, the MCU 20 is configured to perform the second action in step 380, such as notifying a receiving terminal that a short-distance movement event caused by the object has occurred at the location of the motion detecting system 100 or that the object exhibits a high-speed movement or a high-frequency movement. For example, the MCU 20 may send a notification message to any pre-linked user device, such as a cell phone, a tablet computer or a personal computer, but not limited thereto.

In step 370, when the MCU 20 does not receive the second notice signal within the first predetermined period after the microwave motion sensor 10 switches to operate with the second configuration, the MCU 20 is configured to send the second configuration signal to the microwave motion sensor 10 for instructing the microwave motion sensor 10 to operate with the first configuration in step 390. Also, the MCU 20 is configured to switch to operate in the first mode, thereby reducing power-consumption. Step 320 is executed again for determining whether another first motion can be detected by the microwave motion sensor 10 when operating with the first configuration.

Figure 4:
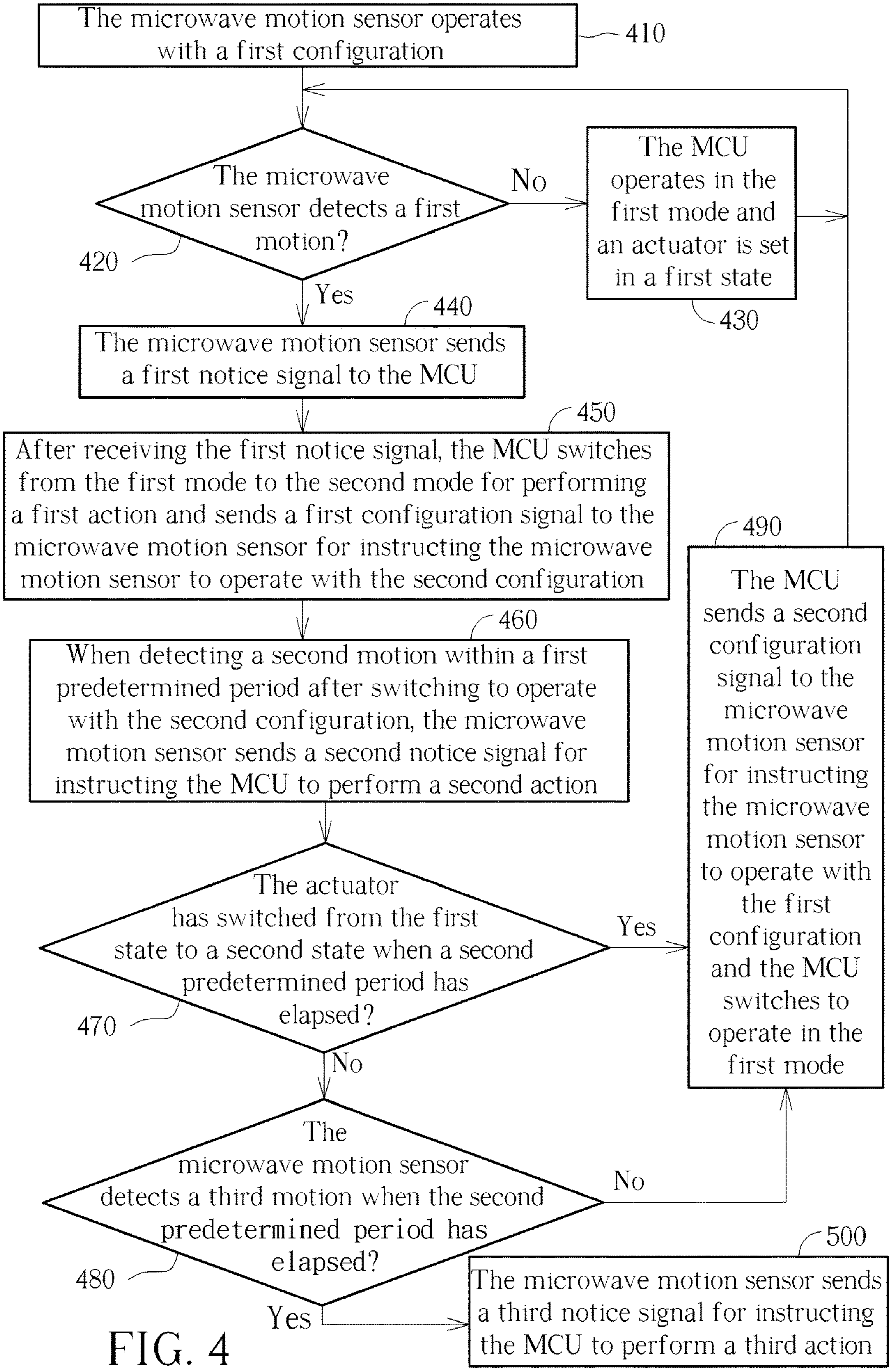
FIG. 4 is a flowchart illustrating the operation of a motion detection system when implemented as a smart door lock according to an embodiment of the present invention.

FIG. 4 is a flowchart illustrating the operation of the motion detection system 100 when implemented as a smart door lock. The flowchart in FIG. 4 includes the following steps:

Step 410: the microwave motion sensor 10 operates with a first configuration.

Step 420: determine whether the microwave motion sensor 10 detects a first motion when operating with the first configuration; if yes, execute step 440; if no, execute step 430.

Step 430: the MCU 20 operates in the first mode and an actuator is set in a first state; execute step 420.

Step 440: the microwave motion sensor 10 sends a first notice signal to the MCU 20.

Step 450: after receiving the first notice signal, the MCU 20 switches from the first mode to the second mode for performing a first action and sends a first configuration signal to the microwave motion sensor 10 for instructing the microwave motion sensor 10 to operate with the second configuration.

Step 460: when detecting a second motion within a first predetermined period after switching to operate with the second configuration, the microwave motion sensor 10 sends a second notice signal for instructing the MCU 20 to perform a second action.

Step 470: determine whether the actuator has switched from the first state to a second state when a second predetermined period has elapsed after the MCU 30 performs the second action; if yes, execute step 500; if no, execute step 480.

Step 480: determine whether the microwave motion sensor 10 detect a third motion when the second predetermined period has elapsed after the MCU 30 performs the second action; if yes, execute step 490; if no, execute step 500.

Step 490: the MCU 20 sends a second configuration signal to the microwave motion sensor 10 for instructing the microwave motion sensor 10 to operate with the first configuration and the MCU 20 switches to operate in the first mode.

Step 500: the microwave motion sensor 10 sends a third notice signal for instructing the MCU 20 to perform a third action.

In the embodiment depicted in FIG. 4, the state of the actuator may be controlled in order to lock or unlock the smart door lock. When receiving the correct password via a user interface (such as keypad, contact type touch panel or non-contact type touch panel), the actuator may be set to the second state (unlocked state) so that the door can be opened. Without receiving the correct password, the actuator may be set to the first state (locked state) so that the door cannot be opened. The microwave motion sensor may perform long-distance motion detection (as depicted by the sensing range SR1 in FIG. 2A), wide-range motion detection (as depicted by the sensing range SR1 in FIG. 2B), long-distance and wide-range motion detection (as depicted by the sensing range SR1 in FIG. 2C), or slow-speed/low-frequency motion detection (as depicted by the sensing range SR1 in FIG. 2D) when operating with the first configuration; the microwave motion sensor may perform short-distance motion detection (as depicted by the sensing range SR2 in FIG. 2A), narrow-range motion detection (as depicted by the sensing range SR2 in FIG. 2B), short-distance and narrow-range motion detection (as depicted by the sensing range SR2 in FIG. 2C), or fast-speed/high-frequency motion detection (as depicted by the sensing range SR2 in FIG. 2D) when operating with the second configuration. The MCU 20 may perform the first action in the first mode by activating the user interface. The MCU 20 may perform the second action in the second mode by starting a timer. The MCU 20 may perform the third action in the second mode by sending an alarm signal.

In step 410, the microwave motion sensor 10 of the motion detecting system 100 (implemented as a smart door lock) initially operates with the first configuration. In step 420, it is determined whether the microwave motion sensor 10 can detect the first motion when operating with the first configuration. The first motion may be an object entering the long-distance detecting range, an object entering the wide-range detecting range, an object entering the long-distance and wide-range detecting range, or a slow-speed/low-frequency motion.

When the microwave motion sensor 10 does not detect the first motion when operating with the first configuration, the MCU 20 is configured to operate in the first mode in step 430, thereby reducing the power consumption of the motion detecting system 100. Meanwhile, the actuator is set to the first state (locked state) so that the door cannot be opened. In an embodiment, the user interface may also be deactivated. In the embodiment depicted in FIG. 4, the state of the actuator may be controlled by the MCU 20 or an external processing unit (not shown). For example, the MCU 20 or the external processing unit may set the actuator to the second state (unlocked state) when the correct password is inputted via the user interface, or to the first state (locked state) when the correct password is not inputted via the user interface.

When the microwave motion sensor 10 detects the first motion when operating with the first configuration, it indicates that an object has entered the long-distance detecting range or the wide-range detecting range, or that the object exhibits slow-speed/low frequency movement. The above-mentioned object may be a co-living relative or friend, a visitor or and a passer-by. The above-mentioned slow-speed/low frequency movement may be the walking of a passer-by. The detection of the first motion indicates an object is approaching the location of the motion detecting system 100. Under such circumstance, the microwave motion sensor 10 is configured to send the first notice signal (such as a wake-up signal) to the MCU 20 in step 440.

In step 450, after receiving the first notice signal, the MCU 20 is configured to switch from the first mode to the second mode for performing the first action, such as activating the user interface. For example, the MCU 20 may light up the numbers on a touch panel for receiving passwords. Also, the MCU 20 is configured to send the first configuration signal to the microwave motion sensor 10 for instructing the microwave motion sensor 10 to operate with the second configuration, thereby determining the identity and the intention of the approaching object.

When the microwave motion sensor 10 detects the second motion when operating with the second configuration, it indicates that the above-mentioned object has entered the short-distance detecting range or the narrow-range detecting range, or that the object exhibits fast-speed/high-frequency movement. For example, the detected second motion may be the hand wave of a visitor or a bell-ringing hand gesture, but not limited thereto. When the microwave motion sensor 10 does not detect the second motion within the first predetermined period after switching to operate with the second configuration, it indicates that the first motion detected with the first configuration may be caused by a passer-by and does not require attention. Therefore, the microwave motion sensor 10 is configured to send the second notice signal (such as a wake-up signal) only when detecting the second motion within the first predetermined period after switching to operate with the second configuration in step 460. After receiving the second notice signal, the MCU 20 is configured to perform the second action, such as activating the timer associated with the second predetermined period.

In step 470, it is determined whether the actuator has switched from the first state (locked state) to the second state (unlocked state) when the second predetermined period has elapsed after the MCU performs the second action. If it is determined that the actuator still remains in the first state (locked state), it indicates that the second motion detected by the microwave motion sensor 10 in step 460 is not inputting the correct password via the user interface, and the microwave motion sensor 10 is then configured to determine whether the third action can be detected in step 480. When the second predetermined period has elapsed after the MCU performs the second action, if it is determined that the actuator still remains in the first state (locked state) and that the third motion can be detected, it indicates a possible burglary, such as when someone has entered incorrect passwords several times or tried to crack the door. Under such circumstance, the microwave motion sensor 10 is configured to send the third notice signal for instructing the MCU 20 to perform the third action, such as sending an alarm signal. In an embodiment, the MCU 20 may send an alarm message to any pre-linked user device, such as a cell phone, a tablet computer or a personal computer, but not limited thereto.

If it is determined that the actuator still remains in the first state (locked state) in step 470 and that the third motion is not detected in step 480, it indicates that the second motion detected by the microwave motion sensor 10 in step 460 may only be a random person passing by instead of a possible burglary. Under such circumstance, the MCU 20 is configured to send the second configuration signal to the microwave motion sensor 10 for instructing the microwave motion sensor 10 to operate with the first configuration in step 490. Also, the MCU 20 is configured to switch to operate in the first mode, thereby reducing power-consumption. The operation of the motion detecting system 100 loops back to step 420 for determining whether another first motion can be detected by the microwave motion sensor 10 when operating with the first configuration.

If it is determined that the actuator has switched from the first state (locked state) to the second state (unlocked state) in step 470, it indicates that the second motion detected by the microwave motion sensor 10 in step 460 is someone inputting the correct password via the user interface, such as a co-living relative or friend opening the door. Under such circumstance, the MCU 20 is configured to send the second configuration signal to the microwave motion sensor 10 for instructing the microwave motion sensor 10 to operate with the first configuration in step 490. Also, the MCU 20 is configured to switch to operate in the first mode, thereby reducing power-consumption. The operation of the motion detecting system 100 loops back to step 420 for determining whether another first motion can be detected by the microwave motion sensor 10 when operating with the first configuration.

In conclusion, the motion detecting system 100 of the present invention can provide multi-step motion detection for home security application. After detecting the first motion with the first configuration, the microwave motion sensor 10 is configured to operate with the second configuration for detecting the second/third motion. The MCU 20 is configured to operate in different modes for performing corresponding actions based on whether the microwave motion sensor can detect actions with different configurations, thereby reducing power consumption. The present motion detecting system can determine the type of motions detected by the microwave motion sensor 10, thereby reducing the false alarm rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detecting method, comprising:

a micro processing unit (MCU) operating in a first mode before receiving a first notice signal;

a microwave motion sensor operating with a first configuration and sending the first notice signal to the MCU after detecting a first motion with the first configuration;

after receiving the first notice signal, the MCU operating in a second mode for performing a first action and sending a first configuration signal to the microwave motion sensor for instructing the microwave motion sensor to operate with a second configuration;

the microwave motion sensor operating with the second configuration determining whether a second motion is detected within a first predetermined period after receiving the first configuration signal;

in response to the second motion being detected within the first predetermined period, the microwave motion sensor continuing to operate with the second configuration and sending a second notice signal to the MCU for instructing the MCU to perform a second action;

the MCU determining whether the second notice signal is received within the first predetermined period; and in response to the second notice signal not being received within the first predetermined period, the MCU sending a second configuration signal to the microwave motion sensor for instructing the microwave motion sensor to operate with the first configuration and the MCU switching to operate in the first mode, wherein:

the microwave motion sensor performs a slow-speed motion detection or a low-frequency motion detection when operating with the first configuration;

the microwave motion sensor performs a fast-speed motion detection or a high-frequency motion detection when operating with the second configuration; and the MCU consumes less power when operating in the first mode than when operating in the second mode.

2. The motion detecting method of claim 1, further comprising:

the microwave motion sensor further performing a long-distance motion detection and/or a wide-range motion detection when operating with the first configuration; and the microwave motion sensor further performing a short-distance motion detection and/or a narrow-range motion detection when operating with the second configuration.

3. The motion detecting method of claim 2, further comprising:

the MCU performing the first action by notifying a receiving terminal that an object is approaching a location of the microwave motion sensor; and the MCU performing the second action by notifying the receiving terminal that a short-distance movement event caused by the object has occurred at the location of the microwave motion sensor.

4. The motion detecting method of claim 1, further comprising:

setting an actuator to a first state in response to the microwave motion sensor not detecting the first motion when operating with the first configuration and when the MCU operates in the first mode; and in response to that a second predetermined period has elapsed after the MCU performs the second action, determining whether the actuator still remains in the first state and whether the microwave motion sensor detects a third motion; and in response to that the actuator still remains in the first state and that the microwave motion sensor detects the third motion, the microwave motion sensor sending a third notice signal to the MCU for instructing the MCU to perform a third action.

5. The motion detecting method of claim 4, further comprising:

in response to that the second predetermined period has elapsed after the MCU performs the second action, determining whether the actuator has switched from the first state to a second state or whether the microwave motion sensor does not detect the third motion;

in response to that the actuator has switched from the first state to the second state or that the microwave motion sensor does not detect the third motion, the microwave motion sensor sending the second configuration signal to the microwave motion for instructing the microwave motion sensor to operate with the first configuration and the MCU switching to operate in the first mode.

6. The motion detecting method of claim 4, further comprising:

the MCU performing the first action by activating a user interface;

the MCU performing the second action by activating a timer associated with the second predetermined period; and the MCU performing the third action by sending an alarm signal.

7. The motion detecting method of claim 6, wherein the MCU sending the second configuration signal to the microwave motion sensor for instructing the microwave motion sensor to operate with the first configuration further comprises:

deactivating the user interface.

8. The motion detecting method of claim 7, wherein the user interface is activated or deactivating by the MCU.

9. The motion detecting method of claim 1, further comprising:

the MCU performing the first action by notifying a receiving terminal that a slow-speed movement or a low-frequency movement caused by an object is detected at a location of the microwave motion sensor; and the MCU performing the second action by notifying the receiving terminal that a fast-speed movement or a high-frequency movement caused by the object is detected at the location of the microwave motion sensor.

10. A motion detecting system, comprising:

a microwave motion sensor, configured to:

operate with a first configuration before receiving a first configuration signal or after receiving a second configuration signal;

send a first notice signal when detecting a first motion with the first configuration;

operate with a second configuration after receiving the first configuration signal and determine whether a second motion is detected within a first predetermined period after receiving the first configuration signal; and send a second notice signal in response to the second motion being detected within the first predetermined period; and a micro processing unit (MCU), configured to:

operate in a first mode before receiving the first notice signal;

after receiving the first notice signal, switch from the first mode to a second mode for performing a first action and send the first configuration signal to the microwave motion sensor for instructing the microwave motion sensor to operate with the second configuration;

after receiving the second notice signal, perform a second action and send the first configuration signal for instructing the microwave motion sensor to operate with the second configuration;

determine whether the second notice signal is received within the first predetermined period; and in response to the second notice signal not being received within the first predetermined period, send the second configuration signal to the microwave motion sensor for instructing the microwave motion sensor to operate with the first configuration and switch to operate in the first mode, wherein:

the microwave motion sensor is configured to perform a slow-speed motion detection or a low-frequency motion detection when operating with the first configuration;

the microwave motion sensor is configured to perform a fast-speed motion detection or a high-frequency motion detection when operating with the second configuration; and the MCU consumes less power when operating in the first mode than when operating in the second mode.

11. The motion detecting system of claim 10, wherein:

the microwave motion sensor is further configured to perform a long-distance motion detection and/or a wide-range motion detection when operating with the first configuration; and the microwave motion sensor is further configured to perform a short-distance motion detection and/or a narrow-range motion detection when operating with the second configuration.

12. The motion detecting system of claim 11, wherein:

the MCU is configured to perform the first action by notifying a receiving terminal that an object is approaching a location of the microwave motion sensor; and the MCU is configured to perform the second action by notifying the receiving terminal that a short-distance movement event caused by the object has occurred at the location of the microwave motion sensor.

13. The motion detecting system of claim 10, wherein:

the MCU is further configured to perform the first action by notifying a receiving terminal that a slow-speed movement or a low-frequency movement caused by an object is detected at a location of the microwave motion sensor; and the MCU is further configured to perform the second action by notifying the receiving terminal that a fast-speed movement or a high-frequency movement caused by the object is detected at the location of the microwave motion sensor.

14. The motion detecting system of claim 10, wherein:

an actuator is set to a first state when the microwave motion sensor does not detect the first motion when operating with the first configuration and when the MCU operates in the first mode; and when a second predetermined period has elapsed after the MCU performs the second action, if it is determined that the actuator still remains in the first state and that the microwave motion sensor detects a third motion, the microwave motion sensor is further configured to send a third notice signal to the MCU for instructing the MCU to perform a third action.

15. The motion detecting system of claim 14, wherein:

when the second predetermined period has elapsed after the MCU performs the second action, if it is determined that the actuator has switched from the first state to a second state or that the microwave motion sensor does not detect the third motion, the MCU is further configured to send the second configuration signal to the microwave motion sensor for instructing the microwave motion sensor to operate with the first configuration and the MCU switch to operate in the first mode.

16. The motion detecting system of claim 14, wherein:

the MCU is configured to perform the first action by activating a user interface;

the MCU is configured to perform the second action by activating a timer associated with the second predetermined period; and the MCU is configured to perform the third action by sending an alarm signal.

17. The motion detecting system of claim 16, wherein the MCU sending the second configuration signal to the microwave motion sensor for instructing the microwave motion sensor to operate with the first configuration further comprises:

deactivating the user interface.

18. The motion detecting system of claim 17, wherein the MCU is further configured to activate or deactivate the user interface.

* * * * *